US008799666B2

(12) United States Patent
Kesanupalli et al.

(10) Patent No.: US 8,799,666 B2
(45) Date of Patent: Aug. 5, 2014

(54) SECURE USER AUTHENTICATION USING BIOMETRIC INFORMATION

(75) Inventors: Ramesh Kesanupalli, San Jose, CA (US); Davit Baghdasaryan, Fremont, CA (US); Frank Schwab, Phoenix, AZ (US); Philip Yiu Kwong Chan, Fremont, CA (US); Larry Hattery, Beaverton, OR (US)

(73) Assignee: Synaptics Incorporated, San Jose, CA (US)

( * ) Notice: Subject to any disclaimer, the term of this patent is extended or adjusted under 35 U.S.C. 154(b) by 600 days.

(21) Appl. No.: 12/731,050

(22) Filed: Mar. 24, 2010

(65) Prior Publication Data
US 2011/0083016 A1 Apr. 7, 2011

Related U.S. Application Data

(60) Provisional application No. 61/249,218, filed on Oct. 6, 2009, provisional application No. 61/292,820, filed on Jan. 6, 2010.

(51) Int. Cl.
*H04L 9/32* (2006.01)
*G06K 9/00* (2006.01)
*G06F 21/00* (2013.01)

(52) U.S. Cl.
USPC ............... 713/180; 382/124; 713/186; 713/7

(58) Field of Classification Search
CPC ............... H04L 2463/102; H04L 63/0407; H04L 63/0861; H04L 63/1441; H04L 63/1466; H04L 63/20; H04L 9/32; H04L 9/3231; H04L 67/306; H04L 9/3247; G06F 17/30864; G06F 17/30899; G06F 21/32; G06F 21/34; G06F 21/6263; G06F 21/57; G06F 2221/2115; G06F 21/33; G06F 21/445; G06F 2221/2117; G06K 9/00906; G06K 19/07354; G06Q 20/04; G06Q 20/10
USPC ................................ 713/180; 382/124; 726/7
See application file for complete search history.

(56) References Cited

U.S. PATENT DOCUMENTS 5,326,104 A 7/1994 Pease et al.
5,428,684 A 6/1995 Akiyama et al.
(Continued)

FOREIGN PATENT DOCUMENTS

EP 2343677 A1 7/2011
EP 2343679 A1 7/2011
(Continued)

OTHER PUBLICATIONS

ITD, "Anti-Money Laundering", ITD, Jan. 22, 2009.
(Continued)

*Primary Examiner* — Saleh Najjar
*Assistant Examiner* — Shu Chun Gao
(74) *Attorney, Agent, or Firm* — Shartsis Friese LLP; Cecily Anne O'Regan; William C. Cray

(57) ABSTRACT

An apparatus includes a biometric sensor capable of identifying biometric information associated with a user. A storage device coupled to the biometric sensor stores user information. A biometric service is coupled to the biometric sensor and capable of communicating with the biometric sensor. A web browser application having a biometric extension communicates with the biometric sensor via the biometric service. The web browser's biometric extension is capable of communicating with multiple web servers.

26 Claims, 11 Drawing Sheets

(56) References Cited

U.S. PATENT DOCUMENTS

| | | | |
|---|---|---|---|
| 5,884,289 A | | 3/1999 | Anderson et al. |
| 5,930,804 A | * | 7/1999 | Yu et al. .............................. 1/1 |
| 6,173,400 B1 | | 1/2001 | Perlman et al. |
| 6,182,076 B1 | | 1/2001 | Yu et al. |
| 6,182,221 B1 | | 1/2001 | Hsu et al. |
| 6,332,193 B1 | | 12/2001 | Glass et al. |
| 6,819,219 B1 | | 11/2004 | Bolle et al. |
| 7,004,389 B1 | | 2/2006 | Robinson et al. |
| 7,014,107 B2 | | 3/2006 | Singer et al. |
| 7,188,362 B2 | | 3/2007 | Brandys |
| 7,200,576 B2 | | 4/2007 | Steeves et al. |
| 7,269,256 B2 | | 9/2007 | Rosen |
| 7,283,534 B1 | | 10/2007 | Kelly et al. |
| 7,356,705 B2 | | 4/2008 | Ting |
| 7,398,390 B2 | | 7/2008 | Hyser |
| 7,530,099 B2 | | 5/2009 | Flurry et al. |
| 7,543,737 B2 | | 6/2009 | Bensimon et al. |
| 7,623,659 B2 | | 11/2009 | Huang et al. |
| 7,664,709 B2 | | 2/2010 | Chantani et al. |
| 7,685,629 B1 | | 3/2010 | White et al. |
| 7,752,450 B1 | | 7/2010 | Palmer et al. |
| 7,797,434 B2 | | 9/2010 | Blakley et al. |
| 7,831,840 B1 | | 11/2010 | Love et al. |
| 7,844,579 B2 | | 11/2010 | Peterson et al. |
| 8,032,932 B2 | | 10/2011 | Speyer et al. |
| 8,078,885 B2 | | 12/2011 | Jobmann |
| 8,112,787 B2 | | 2/2012 | Buer |
| 8,132,242 B1 | | 3/2012 | Wu |
| 2001/0029527 A1 | | 10/2001 | Goshen |
| 2002/0026478 A1 | | 2/2002 | Rodgers et al. |
| 2002/0073046 A1 | | 6/2002 | David |
| 2002/0112062 A1 | * | 8/2002 | Brown et al. .................. 709/229 |
| 2002/0112162 A1 | * | 8/2002 | Cocotis et al. ................. 713/176 |
| 2002/0156726 A1 | | 10/2002 | Kleckner et al. |
| 2002/0174348 A1 | * | 11/2002 | Ting .............................. 713/186 |
| 2003/0074559 A1 | | 4/2003 | Riggs |
| 2003/0123714 A1 | | 7/2003 | O'Gorman et al. |
| 2004/0010697 A1 | | 1/2004 | White |
| 2004/0034784 A1 | | 2/2004 | Fedronic et al. |
| 2004/0230536 A1 | | 11/2004 | Fung et al. |
| 2004/0260657 A1 | | 12/2004 | Cockerham |
| 2005/0109835 A1 | | 5/2005 | Jacoby et al. |
| 2005/0198377 A1 | | 9/2005 | Ferguson et al. |
| 2006/0006224 A1 | | 1/2006 | Modi |
| 2006/0078176 A1 | | 4/2006 | Abiko et al. |
| 2006/0212487 A1 | | 9/2006 | Kennis et al. |
| 2006/0239514 A1 | | 10/2006 | Watanabe et al. |
| 2006/0259873 A1 | | 11/2006 | Mister |
| 2006/0287963 A1 | | 12/2006 | Steves et al. |
| 2007/0016943 A1 | | 1/2007 | M'Raihi |
| 2007/0021198 A1 | | 1/2007 | Muir et al. |
| 2007/0031009 A1 | | 2/2007 | Mwale |
| 2007/0036400 A1 | | 2/2007 | Watanabe et al. |
| 2007/0038867 A1 | | 2/2007 | Verbauwhede et al. |
| 2007/0057763 A1 | | 3/2007 | Blattner et al. |
| 2007/0067828 A1 | | 3/2007 | Bychkov |
| 2007/0076926 A1 | | 4/2007 | Schneider et al. |
| 2007/0180263 A1 | | 8/2007 | Delgrasso et al. |
| 2007/0198435 A1 | * | 8/2007 | Siegal et al. ..................... 705/67 |
| 2007/0226516 A1 | | 9/2007 | Kubota |
| 2007/0237366 A1 | | 10/2007 | Maletsky |
| 2007/0245152 A1 | | 10/2007 | Pizano et al. |
| 2007/0245154 A1 | | 10/2007 | Akkermans et al. |
| 2008/0072061 A1 | | 3/2008 | Cannon et al. |
| 2008/0072063 A1 | | 3/2008 | Takahashi et al. |
| 2008/0127311 A1 | | 5/2008 | Yasaki et al. |
| 2008/0155269 A1 | | 6/2008 | Yoshikawa |
| 2008/0170695 A1 | | 7/2008 | Adler et al. |
| 2008/0178008 A1 | | 7/2008 | Takahashi et al. |
| 2008/0183728 A1 | | 7/2008 | Cornelius et al. |
| 2008/0185429 A1 | | 8/2008 | Saville |
| 2008/0222049 A1 | | 9/2008 | Loomis et al. |
| 2008/0244277 A1 | | 10/2008 | Orsini et al. |
| 2009/0013191 A1 | | 1/2009 | Poposwki |
| 2009/0024499 A1 | | 1/2009 | Ribble |
| 2009/0070860 A1 | | 3/2009 | Hirata et al. |
| 2009/0164796 A1 | | 6/2009 | Peirce |
| 2009/0164798 A1 | | 6/2009 | Gupta |
| 2009/0210942 A1 | | 8/2009 | Abel |
| 2009/0217366 A1 | | 8/2009 | Gao et al. |
| 2009/0228714 A1 | | 9/2009 | Fiske et al. |
| 2009/0319435 A1 | | 12/2009 | Little, Jr. et al. |
| 2010/0049659 A1 | | 2/2010 | Cassone |
| 2010/0083000 A1 | | 4/2010 | Kesanupalli |
| 2010/0088754 A1 | | 4/2010 | Ghislanzoni |
| 2010/0146275 A1 | | 6/2010 | Slick et al. |
| 2010/0191634 A1 | | 7/2010 | Macy et al. |
| 2011/0060913 A1 | | 3/2011 | Hird et al. |
| 2011/0082791 A1 | | 4/2011 | Baghdasaryn et al. |
| 2011/0082800 A1 | | 4/2011 | Baghdasaryn et al. |
| 2011/0082801 A1 | | 4/2011 | Baghdasaryn et al. |
| 2011/0082802 A1 | | 4/2011 | Baghdasaryn et al. |
| 2011/0083018 A1 | | 4/2011 | Kesanupalli et al. |
| 2011/0083170 A1 | | 4/2011 | Kesanupalli et al. |
| 2011/0083173 A1 | | 4/2011 | Baghdasaryn et al. |
| 2011/0138450 A1 | | 6/2011 | Kesanupalli et al. |
| 2012/0012652 A1 | | 1/2012 | Couper et al. |

FOREIGN PATENT DOCUMENTS

| | | | | |
|---|---|---|---|---|
| EP | 2348272 A1 | | 7/2011 | |
| JP | 2006/350767 | | 12/2006 | |
| WO | WO 98/57247 | * | 12/1998 | .............. G06F 11/00 |
| WO | WO 2010/034036 A1 | | 3/2010 | |

OTHER PUBLICATIONS

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Edward Suh and Ariniva Devadas: Physical uncloneable functions for device authentication and secret key generation, ACM, Proceedings of the 44th annual Design Automation Conference, 2007, New York.

* cited by examiner

SECURE USER AUTHENTICATION USING BIOMETRIC INFORMATION

RELATED APPLICATIONS

This application claims the benefit of U.S. Provisional Application No. 61/249,218, filed Oct. 6, 2009, the disclosure of which is incorporated by reference herein. This application also claims the benefit of U.S. Provisional Application No. 61/292,820, filed Jan. 6, 2010. This application also references the following U.S. Non-Provisional Applications: U.S. Non-Provisional application Ser. No. 12/731,027, filed Mar. 24, 2010, U.S. Non-Provisional application Ser. No. 12/731,037, filed Mar. 24, 2010, U.S. Non-Provisional application Ser. No. 12/751,952, filed Mar. 31, 2010, U.S. Non-Provisional application Ser. No. 12/751,964, filed Mar. 31, 2010, U.S. Non-Provisional application Ser. No. 12/751,983, filed Mar. 31, 2010, U.S. Non-Provisional application Ser. No. 12/751,954, filed Mar. 31, 2010, U.S. Non-Provisional application Ser. No. 12/751,969, filed Mar. 31, 2010, and U.S. Non-Provisional application Ser. No. 12/793,499, filed Jun. 3, 2010. All of these co-pending applications are incorporated by reference herein.

BACKGROUND

Typical user authentication systems and procedures use passwords to authenticate the identity of the user. In many instances, Web sites are authenticated using SSL (Secure Sockets Layer) or other protocols. SSL is a protocol for securely transmitting information via the Internet. When using SSL, a Web site is authenticated via its certificate. The user seeking access to the Web site is then authenticated by username and password.

Although passwords are commonly used to authenticate users, passwords are subject to various attacks, such as phishing attacks, social engineering attacks, dictionary attacks and the like. Typically, longer passwords with combinations of letters and numbers provide a higher level of security. However, these longer passwords are more difficult for users to remember. Additionally, passwords provide a single factor of authentication by requiring the user to provide something they know. This factor does not provide any physical authentication of the user's identity. Thus, any person can access the user's Web-based accounts and information if they gain knowledge of the user's password and username.

Another potential threat associated with user passwords is commonly referred to as "Man in the Browser" attack. This type of attack uses a malicious software application (commonly known as "malware") running in the internet browser application while the user is, for example, logging into a web site, accessing confidential information, or performing a financial transaction. One implementation of this attack obtains access to the user's password as the user provides the password to the internet browser application. Once the user's password is obtained, the malware application can perform a variety of malicious actions associated with the user's account.

Therefore, it is desirable to provide a user authentication method and system that provides a more secure authentication of the user than commonly used password-based methods and systems.

BRIEF DESCRIPTION OF THE DRAWINGS

Throughout the description, similar reference numbers may be used to identify similar elements.

DETAILED DESCRIPTION

Figure 1:
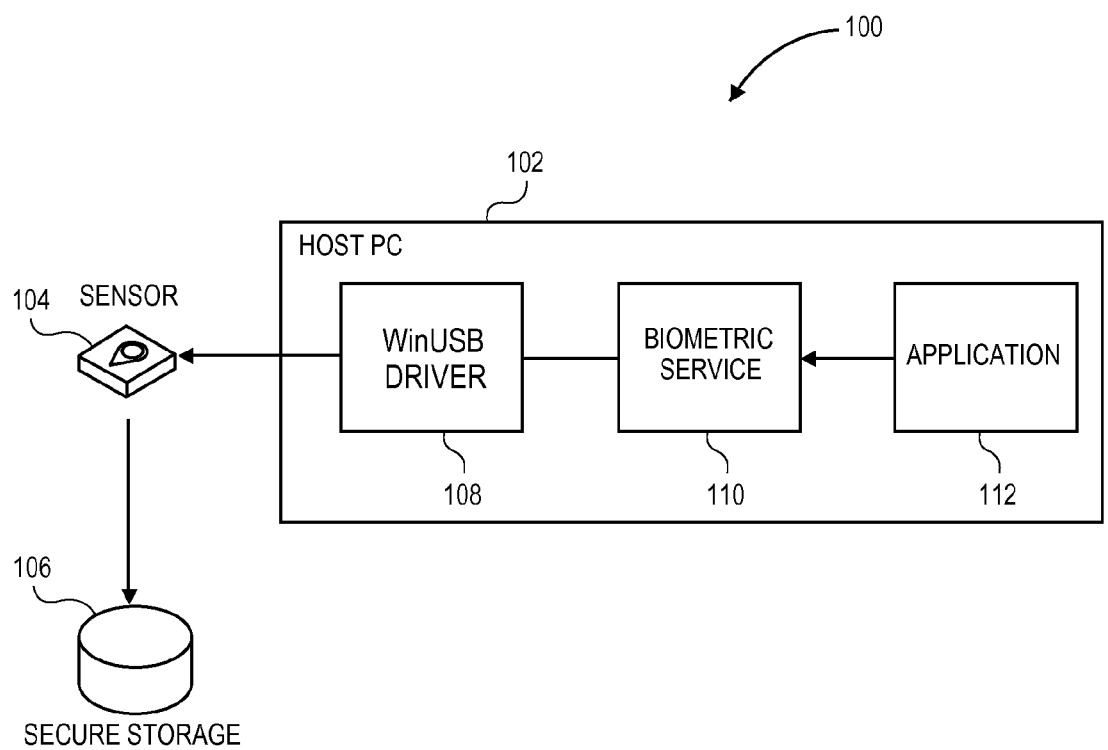
FIG. 1 depicts an example system capable of performing biometric user enrollment and authentication.

The systems and methods described herein relate to biometric authentication of users. "Biometrics" and "biometric information" refers to measurable biological characteristics of a user, such as a fingerprint, facial characteristics, eye characteristics, voice characteristics (also referred to as a "voiceprint") and the like. As discussed herein, biometric information provides an additional level of security when used in systems and procedures related to authentication of a user.

Particular examples discussed herein use fingerprint biometric information to authenticate one or more users. In other embodiments, any type of biometric information may be used instead of fingerprint information. Additionally, a particular embodiment may utilize multiple types of biometric information (e.g., fingerprints and voiceprints) to authenticate a user. Certain described embodiments refer to "swipe" style fingerprint sensors. However, alternate embodiments may include any type of fingerprint sensor, such as a "placement" sensor. In particular embodiments, the biometric sensor is physically attached (or manufactured into) a client device, such as a computer, cellular phone, and so forth. In other embodiments, the biometric sensor is a portable device that is temporarily coupled to the client device (e.g., a pluggable USB device) for enrollment and/or authentication procedures.

As used herein, a "web application", a "web-based application", and a "web-enabled application" refers to a software application or software routine that is capable of communicating with one or more web servers or similar devices via the Internet or other data communication network. Additionally, a "plug-in" or a "browser plug-in" refers to an application or extension that provides a variety of different features and functions. Particular examples of "plug-ins" and "browser plug-ins" discussed herein provide features and functions related to user authentication while, for example, accessing web sites, making secure transactions, and the like. In particular embodiments, the browser plug-in is installed as part of the manufacturing process of devices equipped with associated biometric devices. In specific implementations, the browser plug-in is operable with any biometric device that supports the Windows Biometric Framework or other supported architectures or systems.

As discussed above, typical passwords do not provide any physical authentication of the user's identity. Thus, any person or machine can access a user's Web-based accounts and related information if they gain knowledge of the user's password and username. Using biometric information in the user authentication process provides an increased level of security by authenticating physical characteristics of the user. Thus, an imposter with the correct password but lacking the required physical characteristics will not be authenticated by the system.

The systems and methods described herein perform biometric user authentication in several steps. Initially, a user enrolls with the biometric user authentication system by binding their user credentials with the user's biometric template (a "fingerprint template" in specific implementations). The biometric template contains information related to the user's biometric characteristics (also referred to as "biometric information") obtained from a biometric sensor that scans or reads the user's biometric characteristics, such as a fingerprint. A user identification process identifies a particular user among multiple enrolled users (e.g., multiple users enrolled with a particular device, system or biometric sensor). A user verification process verifies that the user who provides their biometric information is who they claim to be by comparing the user's biometric information with the biometric template obtained during enrollment of that user. The enrollment, identification and verification of users is discussed in greater detail herein.

During an example enrollment process that uses a fingerprint sensor as the biometric sensor, a user swipes their finger across the fingerprint sensor several times to create a fingerprint template. The fingerprint template contains qualitative fingerprint information that allows the user's fingerprint to be distinguished from fingerprints associated with other users. In alternate embodiments, a placement fingerprint sensor (also referred to as a static fingerprint sensor) is used such that a user places their finger on the fingerprint sensor rather than "swiping" their finger across the fingerprint sensor. After creating a fingerprint template, the user (or a web server or other system) provides user credentials, such as a password, cryptographic key, random seed, and the like. The systems and procedures described herein bind the user's fingerprint template with the user credentials. The fingerprint template and user credentials are then stored in a secure storage device. In one embodiment the secure storage device is contained within the fingerprint sensor hardware. In other embodiments, the secure storage device is contained in a device that utilizes the fingerprint sensor.

During an example user identification process (also referred to as a user verification process), a user swipes their finger across a fingerprint sensor. The process then determines whether the user's fingerprint information matches a fingerprint template associated with the fingerprint sensor. If the user's fingerprint information matches a fingerprint template, the user's credentials are released to the user and/or a service or process requesting the user verification. Thus, the user credentials are not released from the secure storage device until a matching fingerprint template is confirmed. In particular embodiments, the user credentials released as a result of a match with a fingerprint template are not necessarily the same credentials provided by the user during the enrollment process. For example, the user credentials released after finding a matching fingerprint template may include an OTP (One Time Password) token, RSA signature and the like. The enrollment process can be initiated by a Web server, a Web browser plug-in, and the like.

The described systems and methods communicate user credentials to a specific address, location, or other recipient identifier. Thus, even if an imposter can gain access to the user credentials, the system will send those user credentials to a predetermined address or location, thereby preventing the imposter from attempting to have the user credentials sent to an alternate address or location. The address or location information is stored within the user credentials and is established as part of the enrollment process.

Particular embodiments of the systems and methods discussed herein use strong cryptographic algorithms implemented in hardware and/or software. Example cryptographic algorithms include AES (Advanced Encryption Standard) 256, SHA (Secure Hash Algorithm) 256 and RSA 2048. Example biometric sensors are compatible with various standards, such as OATH-OCRA (OATH Challenge/Response Algorithms), TOPT (Time-based One-time Password Algorithm), HOPT (HMAC-Based OTP Algorithm) and PKCS (Public Key Cryptography Standards) #11, RSA SecureID based OTP, and the like.

In a particular implementation, each biometric sensor has a unique identifier (ID) that is used to strengthen the level of security provided by the system or process. This unique ID provides an additional authentication factor representing "something you have". Since each biometric sensor has a unique ID, each user's biometric template and user credentials can be uniquely associated with a specific biometric sensor.

Specific implementations include a biometric sensor as part of a multi-component or multi-element authentication system. Particular embodiments may include one or more authentication factors, such as: 1. something you are; 2. something you have; and 3. something you know.

The systems and methods described herein are useful in performing Web site authentication. In example embodiments, a Web site that supports the authentication procedures discussed herein includes an HTML (Hyper Text Markup Language) tag that identifies a Web browser plug-in (also referred to as a "biometric plug-in") that is installed on the user's computing device. This HTML tag indicates to the browser that the Web site supports biometric authentication. Other example embodiments include an extension of an existing Web browser plug-in. Further implementations may utilize a browser helper object, ActiveX control, Browser Extension, or other approaches. In particular implementations, the Web browser plug-in obtains the biometric sensor's unique ID and communicates that unique ID (or a hash of the unique ID) to a web server via HTTP or HTTPS.

When a user accesses the Web site, the Web browser plug-in is activated and detects that a biometric sensor is installed in the user's computing device. The Web site suggests that the user enroll with their biometric sensor to provide a more secure user authentication. If the user accepts, the Web browser plug-in activates the enrollment process to enroll the user. This enrollment process includes binding the Web site to the specific user. The Web site then generates a secret key and passes the secret key to the user's computing device via a secure connection between the Web site and the user's computing device. In a particular implementation, the "enrollment" process includes enrolling the user's fingerprint and generating a secret key.

If the user also wants to bind their computing device with Web site authentication, the Web browser plug-in sends the biometric sensor's ID to the Web site server or other device/system. Multiple embodiments store information in various formats and on various devices or components within a system. Example embodiments may utilize a hash of the shared secret, a hash of the biometric sensor ID, and the like. At this point, the user can select different factors for authentication. In a particular embodiment, the Web site may require stronger authentication when an important operation is being performed on the Web site, such as accessing a bank account or other sensitive data.

After a user has enrolled with a particular Web site that supports biometric authentication, subsequent visits to the same Web site cause the Web browser plug-in to detect that the user has already enrolled with the Web site. In this situation, the Web site prompts the user to perform user authentication (e.g., using the biometric device). In the case of a fingerprint sensor, the user swipes their finger across the fingerprint sensor or places their finger on the fingerprint sensor. If the fingerprint information matches a fingerprint template associated with the fingerprint sensor, the Web browser plug-in releases user secrets from the user credentials. In particular embodiments, the fingerprint sensor releases an OTP token or an RSA signature instead of plaintext credentials. After the credentials are released, they are communicated to the Web site to complete the user authentication process. In specific implementations, the server may generate a random challenge and communicate that challenge to the client device. The Web browser plug-in (or the biometric sensor) uses this challenge to construct a response based on the secure key and the random challenge. The response may be a hash of the secure key, a hash of the random challenge, or any other calculation. The server validates the user credentials and authenticates the user if the validation is successful.

In particular implementations, the user performs the enrollment process for each Web site the user accesses that supports biometric authentication. Additionally, different user credentials are associated with each Web site with which the user enrolls. Thus, if the user enrolls with five different Web sites that support biometric authentication, the biometric sensor in the user's computing device stores five separate sets of user credentials, each of which is associated with one of the five different Web sites. Additionally, if different users access the same Web site, separate user credentials and separate biometric templates are maintained for each user.

Particular embodiments of the Web browser plug-in support WBF (Windows Biometric Framework), thereby supporting any biometric device that supports the WBF interface. The Web browser plug-in also supports the Application Programming Interface specified by the BioAPI Consortium.

In alternate embodiments, the systems and methods determine that a Web site supports biometric authentication by providing a service or process that monitors Web site data and detects certain types of transactions on secure web sites. When a secure transaction is initiated, the systems and methods check the computing device accessing the Web site to determine if the computing device includes a fingerprint sensor or other biometric device. If so, an enrollment and/or authentication process is activated to offer an enhanced level of security to the user, as described herein.

FIG. 1 shows an example system 100 capable of performing biometric user enrollment and authentication via a biometric sensor 104 (such as a fingerprint sensor or other biometric device). In this example, a biometric service 110 executes on a host PC 102 and communicates with one or more applications 112 that may request user authentication. Example applications include Internet browser applications, financial applications, and the like. In a particular embodiment, the validity biometric service uses a Windows API (e.g., a WinUSB Driver) 108 to encrypt a fingerprint template database with system account credentials. In alternate embodiments, any type of API or similar interface may be used in place of Windows API 108. Biometric sensor 104 has a unique 128 bit encryption key and a unique identifier (e.g., serial number). The enrolled credentials of a user are encrypted with the encryption key and stored in a storage device, such as secure storage 106. In a particular embodiment, biometric service 110 is implemented as a service application running in a local system account.

In a particular embodiment, application 112 is an Internet browser application executing on host PC 102 and communicating with various web servers via the Internet. Application 112 includes a browser extension or browser plug-in that communicates with biometric service 110. In one implementation, biometric service 110 is a secure application executing in a background mode on host PC 102. Thus, biometric service 110 provides a communication interface to biometric sensor 104. The browser extension (or browser plug-in) associated with application 112 is capable of communicating transaction details, random challenges, signature information, user information, and other data to biometric service 110. Biometric service 110 also communicates with one or more web servers as part of the user enrollment and/or user authentication procedure.

Figure 2:
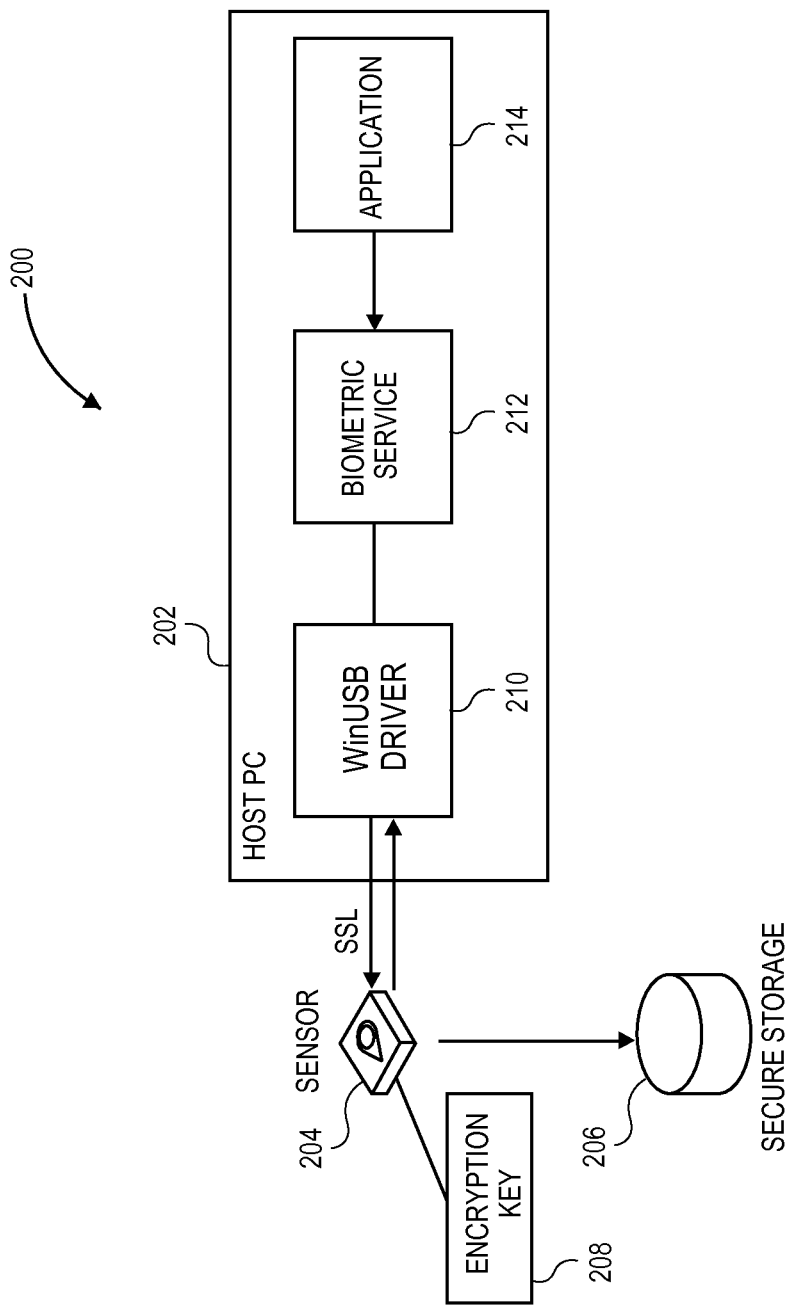
FIG. 2 depicts another example system capable of performing biometric user enrollment and authentication.

FIG. 2 shows another example system 200 capable of performing biometric user enrollment and authentication via a biometric sensor 204. System 200 includes a host PC 202, a WinUSB driver 210, a biometric service 212 and an application 214 similar to the components discussed above with respect to FIG. 1. In the example of FIG. 2, the biometric sensor decrypts the user credentials only after a successful biometric reading, such as a fingerprint swipe or fingerprint scan (using a placement style fingerprint sensor). For example, in a successful fingerprint swipe, the swiped fingerprint information matches a fingerprint template associated with the fingerprint sensor. In a particular embodiment, the validity enterprise sensor has a unique 256 bit encryption key 208 and a unique identifier (e.g., serial number). The biometric sensor 204 creates a secure communication with Host PC 202 using SSL v3 protocol or other secure communication technique. In a particular implementation, biometric sensor 204 includes a "match on chip" functionality that releases a user's credentials only upon a successful fingerprint swipe or other biometric reading. User credentials and other information may be stored within biometric sensor 204, in a secure storage 206, or any other storage mechanism. In certain embodiments, the validity biometric service is implemented as a service application running in a local system account.

Figure 3:
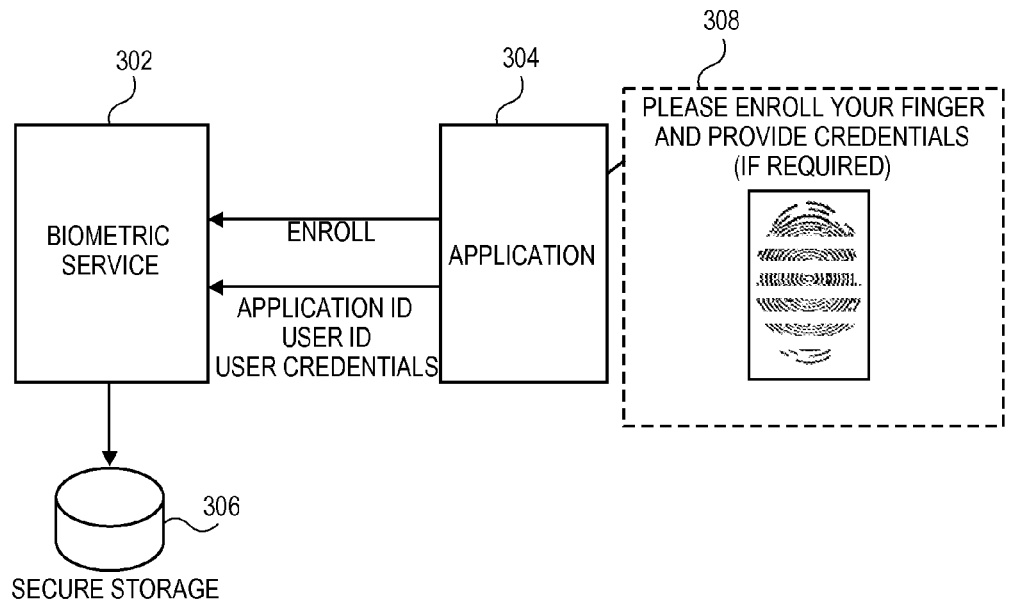
FIG. 3 depicts an example user enrollment process.

FIG. 3 shows an example user enrollment process in which the user enrolls using a fingerprint sensor to bind the user's fingerprint template with the user's credentials. An application 304 that desires to enroll a user with a biometric device communicates with a biometric service 302, which is coupled to a secure storage 306. Biometric service 302 is also coupled to a biometric sensor (not shown), which captures biometric data and communicates that data to the biometric service. Application 304 initiates the user enrollment process by displaying a request 308 for the user to provide their fingerprint (in the case of a fingerprint sensor) and provide user credentials. Application 304 communicates a user enrollment request to biometric service 302 as well as information regarding a user identifier (user id), an application identifier, and user credentials. The biometric service then captures the fingerprint data and stores the fingerprint data in secure storage 306. Additional details regarding the user enrollment process are provided herein.

Figure 4:
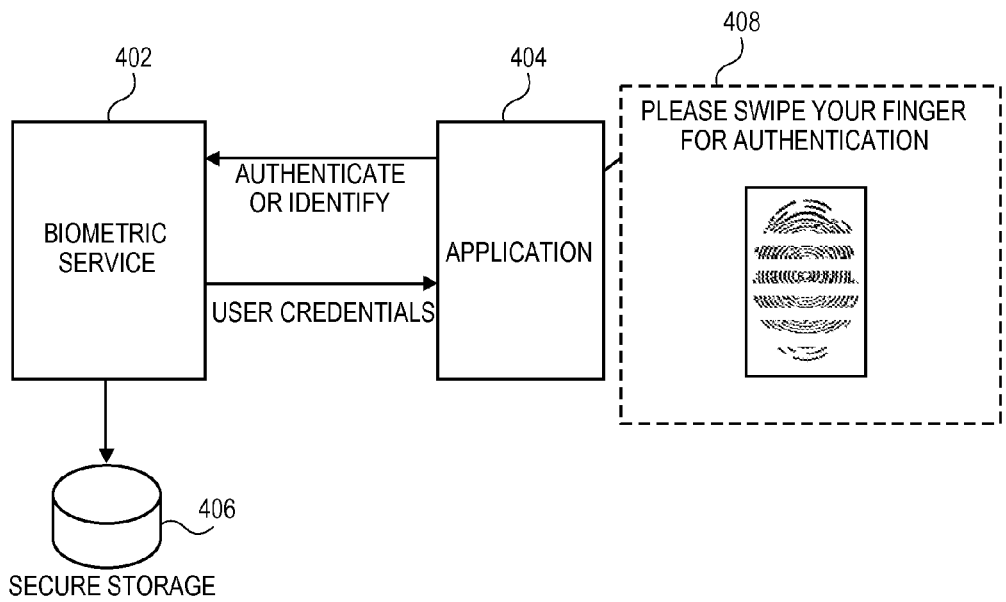
FIG. 4 depicts an example user authentication process.

FIG. 4 shows an example user authentication process using a fingerprint sensor. An application 404 that desires to authenticate a user with a biometric device communicates with a biometric service 402, which is coupled to a secure storage 406. Biometric service 402 is also coupled to a biometric sensor (not shown), which captures biometric data and communicates that data to the biometric service. Application 404 initiates the user authentication process by displaying a request 408 for the user to provide their fingerprint (in the case of a fingerprint sensor). Application 404 communicates an authentication and/or identity request to biometric service 402. The biometric service then captures the fingerprint data and identifies user credentials for the user associated with the fingerprint data. The user credentials are then communicated to application 404. Additional details regarding the user authentication process are provided herein.

Figure 5:
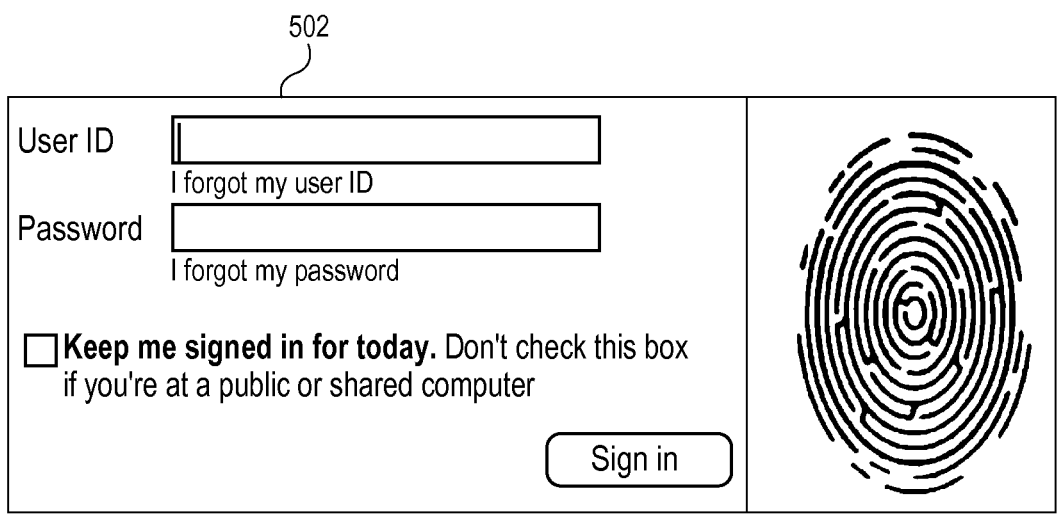
FIG. 5 depicts an example user login interface.

FIG. 5 shown an example user login interface 502 displayed during the user authentication process. The example of FIG. 5 requests a user ID and a password, then asks the user to provide biometric information, such as swiping their finger across a fingerprint sensor. Alternate embodiments of user login interface 502 may request more or less information from the user, such as requesting other credentials or identifying information from the user.

Figure 6:
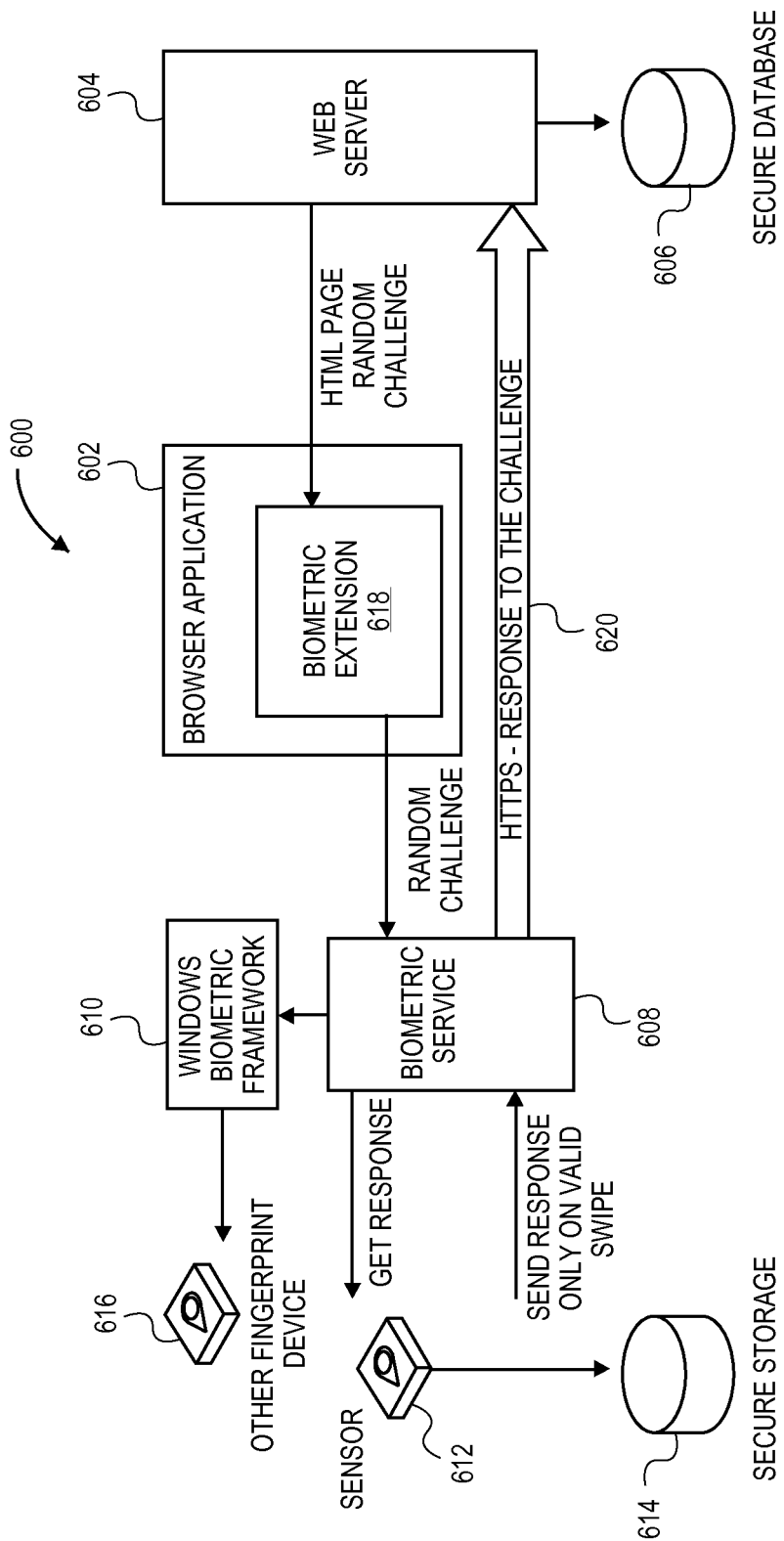
FIG. 6 depicts another example system capable of performing biometric user enrollment and authentication.

FIG. 6 shows another example system 600 capable of performing biometric user enrollment and authentication using any number of different types or brands of fingerprint sensors. Depending on the fingerprint sensor type and/or manufacturer, the system of FIG. 6 uses 1) a WBF (Windows Biometric Framework) interface, 2) a biometric service, or 3) any other system or service to communicate data between an Internet browser application and the fingerprint sensor.

System 600 includes a browser application 602 capable of communicating with a web server 604 and a biometric service 608. Browser application 602 includes a biometric extension 618 that facilitates communication and handling of biometric-related data. In alternate embodiments, biometric extension 618 is replaced with a browser application plug-in. Web server 604 is coupled to a secure database 606 that stores various data, such as data used during the biometric user enrollment and authentication procedures, as discussed herein.

Biometric service 608 communicates with a Windows biometric framework 610 and a fingerprint sensor 612. Windows biometric framework 610 also communicates with a fingerprint sensor 616 that is not able to communicate directly with biometric service 608. Thus, Windows biometric framework 610 provides an interface between fingerprint sensor 616 and biometric service 608. Fingerprint sensor 612 is capable of communicating directly with biometric service 608 without needing Windows biometric framework 610. Fingerprint sensor 612 is coupled to a secure storage 614 that stores user credentials, an encryption key, and related data.

During operation of system 600, web server 604 sends a web page (e.g., an HTML page) and a random challenge to browser application 602. Biometric extension 618 communicates the random challenge to biometric service 608, which requests a response from fingerprint sensor 612 (or requests a response from fingerprint sensor 616 via Windows biometric framework 610). Fingerprint sensor 612 sends a response to biometric service 608 after a valid fingerprint swipe (or scan). Thus, if a user fails to swipe a finger or fingerprint sensor 612 reads invalid fingerprint information, no response is sent to biometric service 608. In alternate embodiments, fingerprint sensor 612 sends an "invalid fingerprint" message to biometric service 608 if the fingerprint sensor reads invalid fingerprint information. If biometric service 608 receives a positive response from fingerprint sensor 612 (e.g., a valid fingerprint swipe), the biometric service communicates a response to the random challenge to web server 604 using a secure communication link. Additional details regarding biometric user enrollment and authentication are provided below.

In a particular embodiment, a secret key (also referred to as a "secure key") is generated by a web server and stored by the web server. The secret key is also provided to the biometric sensor and/or the system containing the biometric sensor, and stored along with the biometric template associated with the user. The secret key can be a cryptographic key (DES, AES, etc.), a random seed, a random number, an RSA private key, and so forth. In alternate embodiments, the secret key is generated by a client device and communicated to the web server. The secure key may be transferred using HTTP or HTTPS and can be transferred directly to the browser application or directly to the browser application plug-in (or browser application extension). The biometric template is typically generated during enrollment of the user. Additionally, if the biometric device has a unique ID, that unique ID is sent to the web server for storage and use in future authentication procedures.

In particular embodiments, binary files used in the systems and methods discussed herein are signed and authenticated prior to running the binary files. This approach blocks malicious attempts to replace or edit the binary files. Additionally, applications communicating with the biometric service are validated at runtime.

Figure 7:
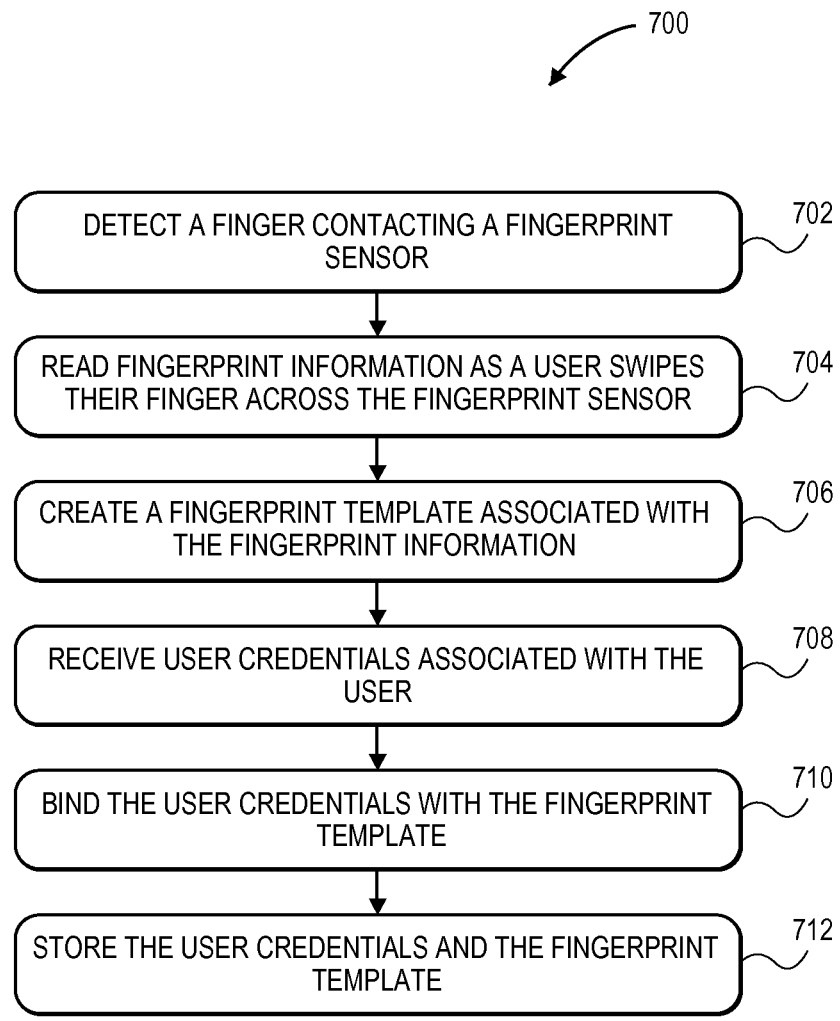
FIG. 7 is a flow diagram depicting an embodiment of a procedure for enrolling a user of a biometric authentication system.

FIG. 7 is a flow diagram depicting an embodiment of a procedure 700 for enrolling a user of a biometric authentication system. Initially, procedure 700 detects a finger contacting a fingerprint sensor or other biometric sensor (block 702). Fingerprint information is read as the user swipes their finger across the fingerprint sensor (block 704). In alternate embodiments using a placement fingerprint sensor, the fingerprint information is scanned as the user positions their finger on the sensor. The procedure continues by creating a fingerprint template associated with the fingerprint information (block 706).

Procedure 700 receives user credentials associated with the user (block 708). Example user credentials include a password, a cryptographic key, a random seed or any other similar confidential information. Next, the procedure binds the user credentials with the fingerprint template (block 710), then stores the user credentials and the fingerprint template (block 712) in a secure storage device.

In a specific embodiment, the procedure also binds a particular web site (e.g., a web site requesting biometric enrollment and/or biometric authentication of a user) with the fingerprint template. Thus, a particular user may perform the biometric enrollment procedure for each web site that the user is to provide future biometric authorization or biometric authentication.

Figure 8:
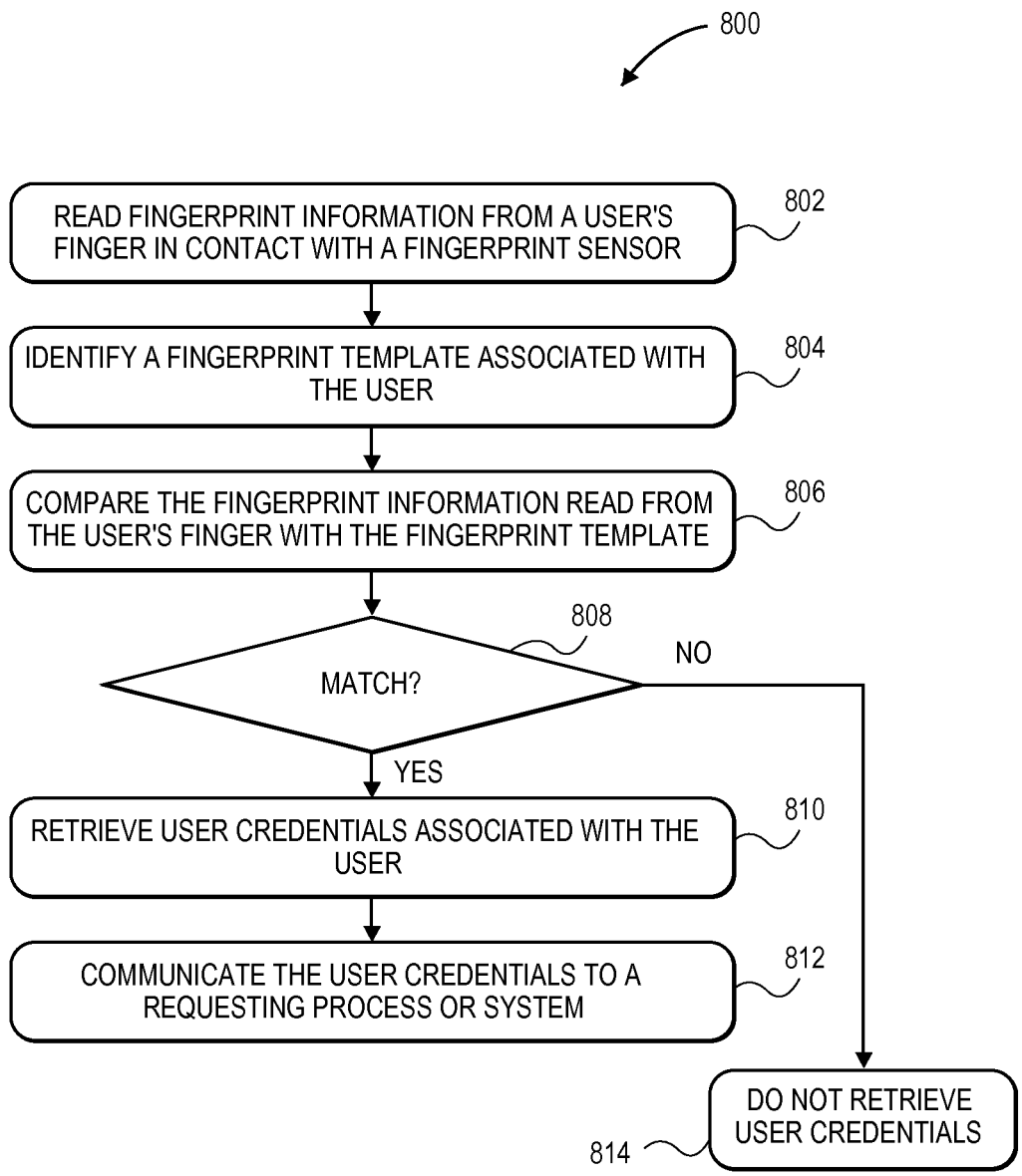
FIG. 8 is a flow diagram depicting an embodiment of a procedure for authenticating a user of a biometric authentication system.

FIG. 8 is a flow diagram depicting an embodiment of a procedure 800 for authenticating a user of a biometric authentication system. Procedure 800 is performed after a particular user has enrolled with the biometric authentication system using, for example, the procedure discussed with respect to FIG. 7. The authentication procedure reads fingerprint information from a user's finger in contact with a fingerprint sensor (block 802). Procedure 800 then identifies a fingerprint template associate with the user (block 804) who is accessing the fingerprint sensor. The fingerprint information read from the user's finger is compared with the fingerprint template (block 806) to determine whether there is a match (block 808). If the fingerprint information read by the fingerprint sensor does not match the information stored in the fingerprint template, the biometric authentication system does not retrieve the user credentials (block 814). Thus, the user credentials remain securely stored if a match is not detected.

If the fingerprint information read by the fingerprint sensor matches the information stored in the fingerprint template, the biometric authentication system retrieves the credentials associated with the user (block 810). The user credentials are then communicated to a requesting process or system (block 812).

Figure 9:
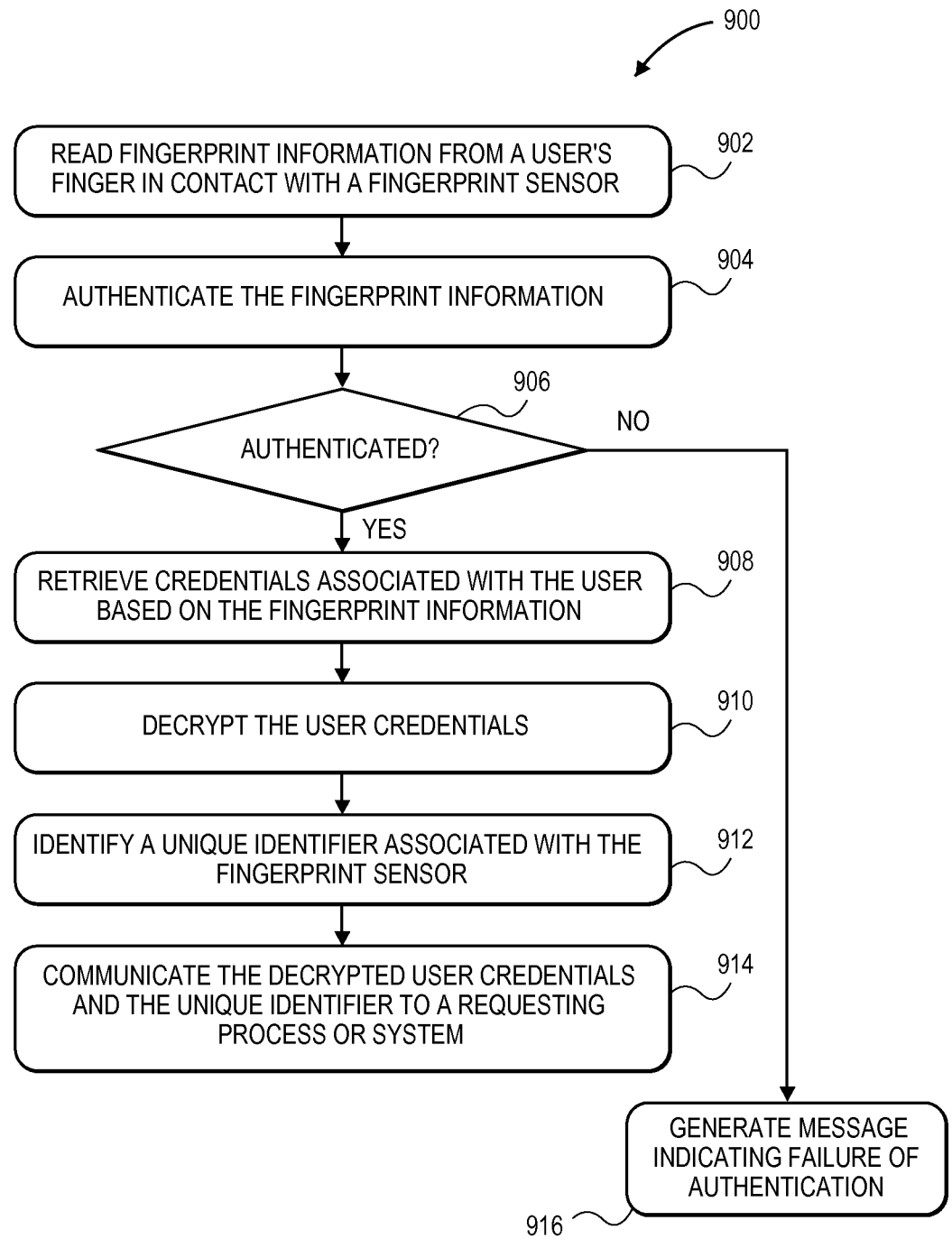
FIG. 9 is a flow diagram depicting another embodiment of a procedure for authenticating a user of a biometric authentication system.

FIG. 9 is a flow diagram depicting another embodiment of a procedure 900 for authenticating a user of a biometric authentication system. Initially, procedure 900 reads fingerprint information from a user's finger in contact with a fingerprint sensor (902). The procedure then authenticates the fingerprint information (block 904). If the fingerprint information is not authenticated, a message is generated indicating an authentication failure (block 906). If the fingerprint information is authenticated, the procedure retrieves credentials associated with the user based on the fingerprint information (block 908). The procedure then decrypts the user credentials (block 910) and identifies a unique identifier associated with the fingerprint sensor (block 912). The decrypted credentials and the unique identifier are communicated to a requesting process or system (block 914).

Figure 10:
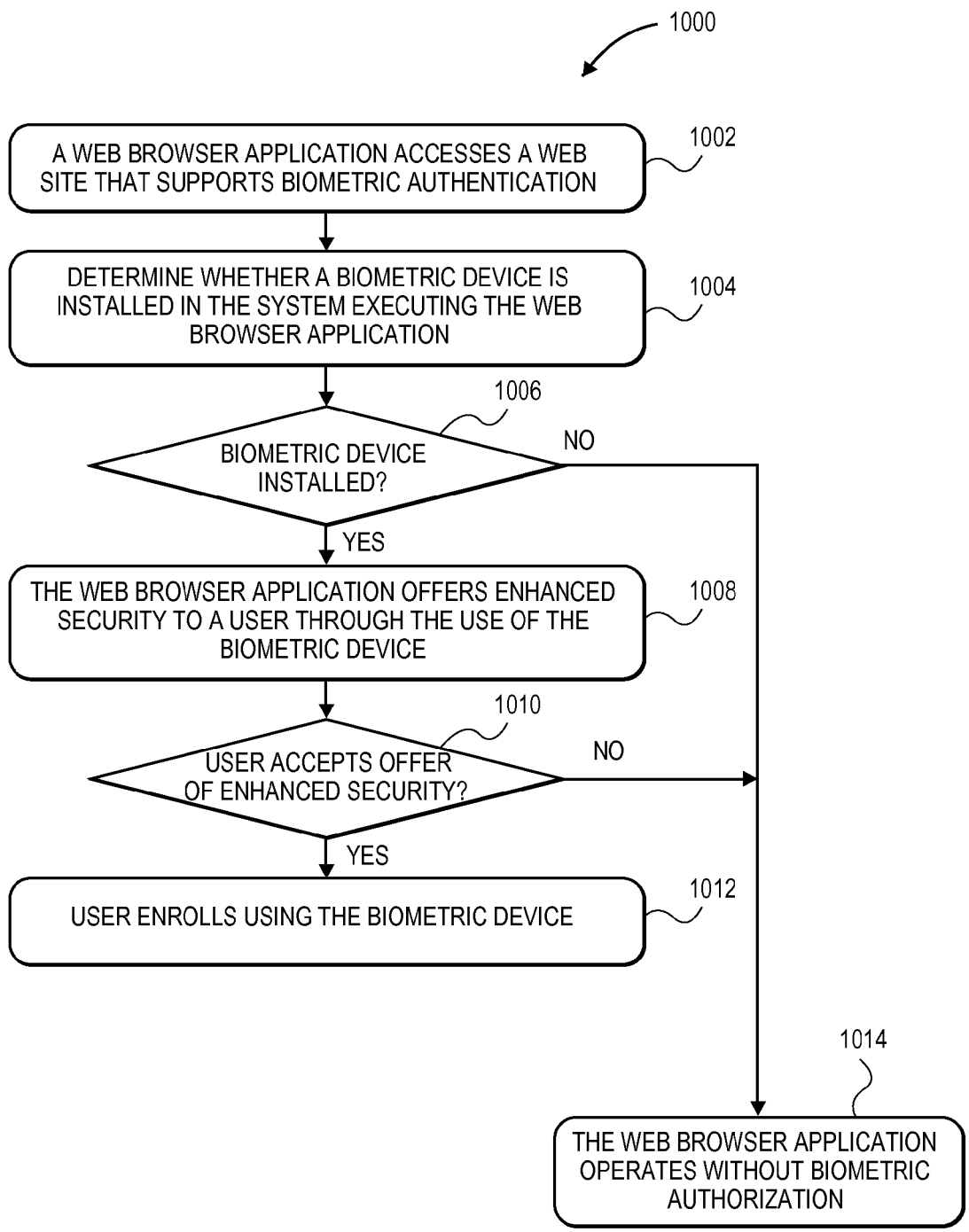
FIG. 10 is a flow diagram depicting an embodiment of a procedure for authenticating a user of a Web browser application that supports biometric authentication.

FIG. 10 is a flow diagram depicting an embodiment of a procedure 1000 for authenticating a user of a Web browser application that supports biometric authentication. Initially, a web browser application accesses a web site that supports biometric authentication (block 1002). The procedure then determines whether a biometric device is installed in the system executing the web browser application (block 1004). The biometric device may be physically installed in the system or coupled to the system, such as via a universal serial bus (USB) or other communication link. If a biometric device is not installed (block 1006), the web browser application operates without biometric authentication (block 1014).

If a biometric device is installed in the system executing the web browser application, the web browser application offers enhanced security to a user through the use of the biometric device (block 1008). If the user accepts the offer of enhanced security at block 1010, the user enrolls using the biometric device (block 1012). The user enrolls, for example, using the enrollment procedure discussed herein. If the user does not accept the offer of enhanced security at block 1010, the web browser application operates without biometric authentication (block 1014).

Figure 11:
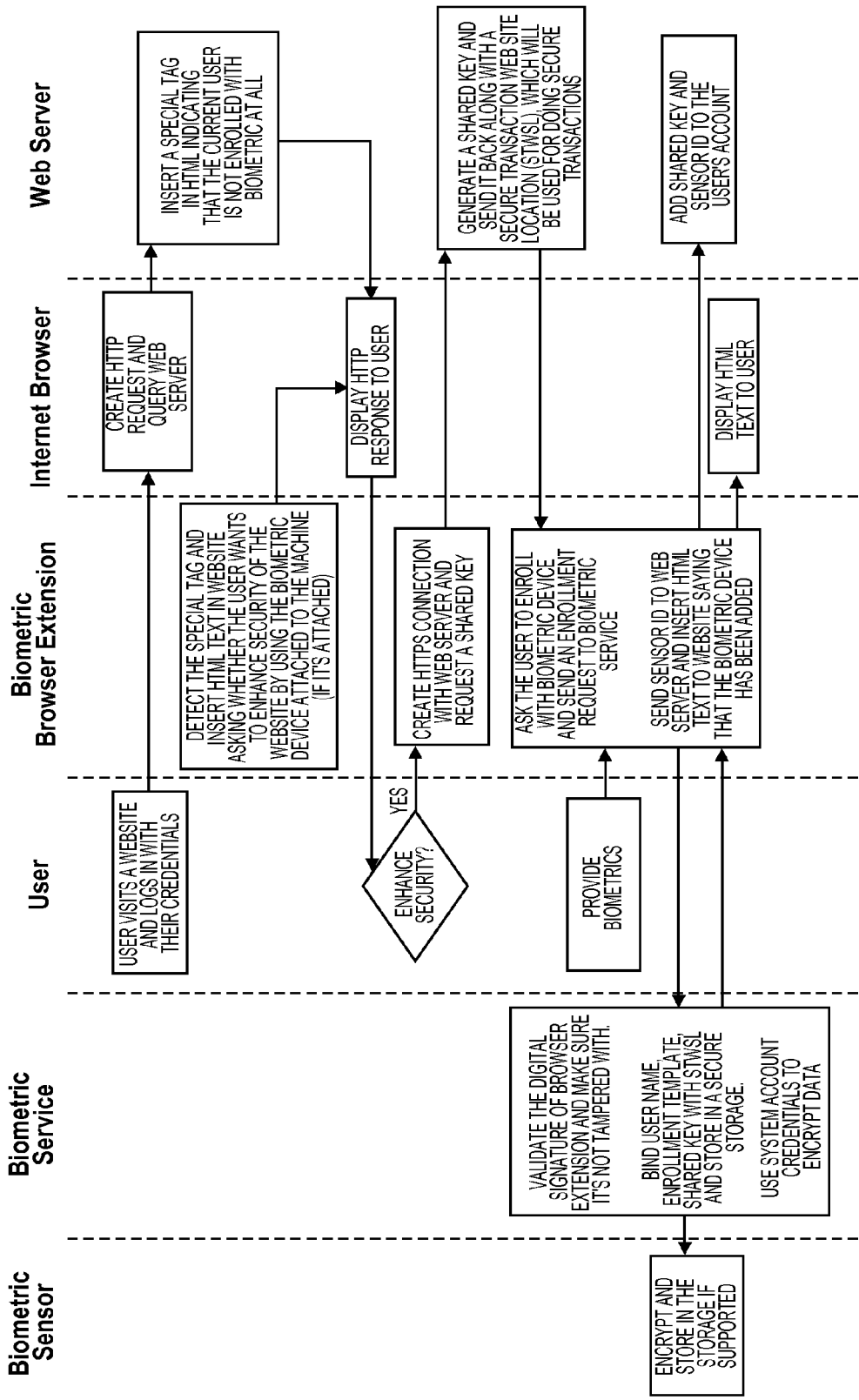
FIG. 11 depicts another embodiment of a procedure for enrolling a user of a biometric authentication system.

FIG. 11 depicts another embodiment of a procedure for enrolling a user of a biometric authentication system. FIG. 11 shows the various actions and functions performed during the enrollment of a user and the component or system that performs those actions or functions.

Figure 12:
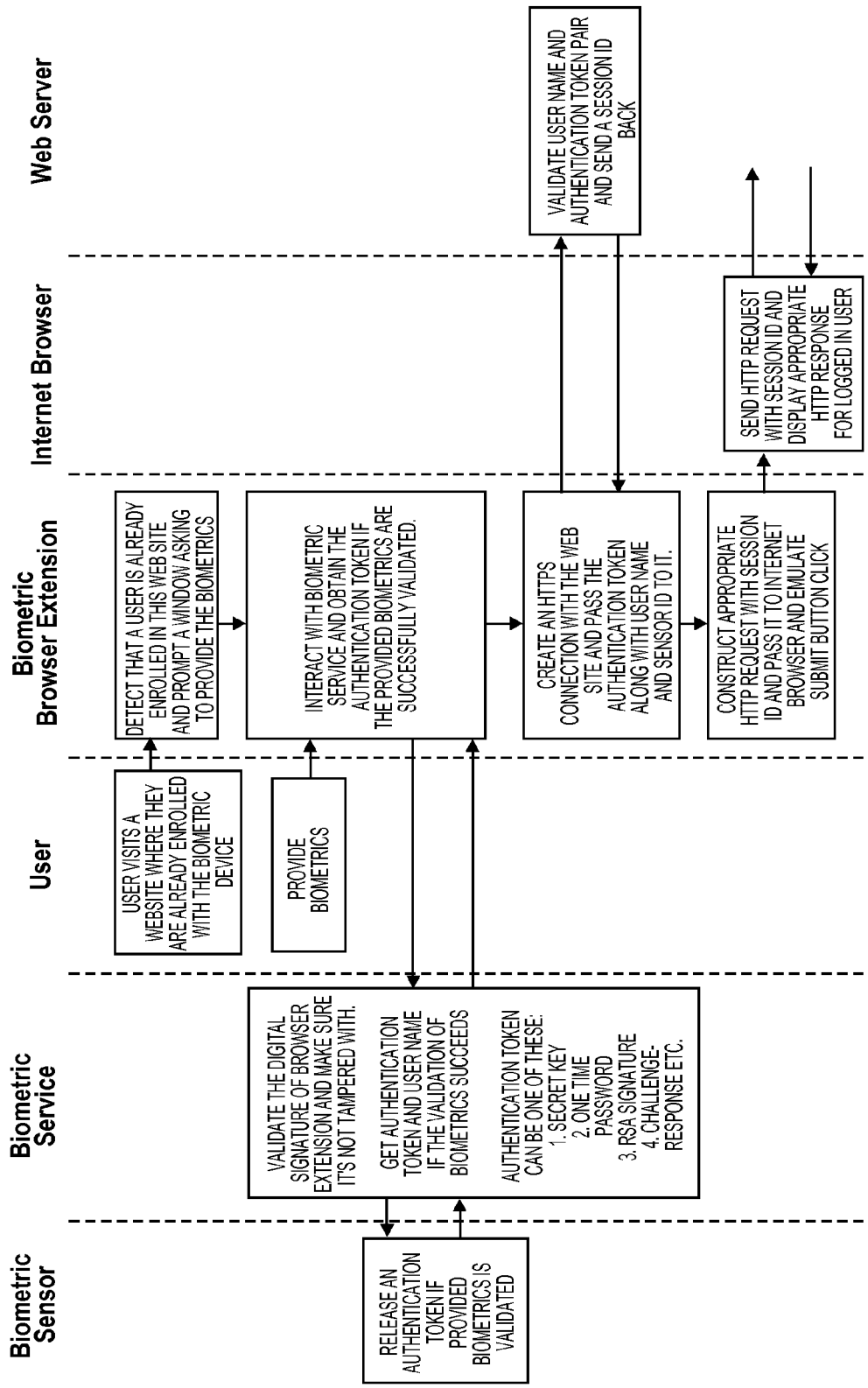
FIG. 12 depicts another embodiment of a procedure for identifying and authenticating a user of a biometric authentication system.

FIG. 12 depicts another embodiment of a procedure for identifying and authenticating a user of a biometric authentication system. FIG. 12 shows the various actions and functions performed during the identification and authentication of a user and the component or system that performs those actions or functions.

The invention may also involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the system and method described herein facilitate enrollment and authentication of users through a biometric device, such as a fingerprint sensor. Additionally, some embodiments are used in conjunction with one or more conventional fingerprint sensing systems and methods. For example, one embodiment is used as an improvement of existing fingerprint detection and/or sensing systems.

Although the components and modules illustrated herein are shown and described in a particular arrangement, the arrangement of components and modules may be altered to enroll and authenticate users in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. An apparatus comprising:
a web server computing device configured to provide to a user computing device, at least one of a biometric browser extension and a biometric browser plug-in as part of a biometric service browser application for execution on a user computing device;
the at least one of the biometric browser extension and the biometric browser plug-in configured to detect a visit by the user computing device to a web site produced by the web server computing device, with which the user computing device has previously been enrolled;
the at least one of the biometric browser extension and the biometric browser plug-in configured to prompt the user to provide biometric identification of the user through a biometric service executing on the user computing device and interfacing the one of the biometric browser extension and the biometric browser plug-in with a biometric sensor associated with the user computing device;
the at least one of the biometric browser extension and the biometric browser plug-in configured to receive from the biometric service an authentication token and user identification produced by the biometric sensor responsive to a validation of biometric identification of the user by the biometric sensor and responsive to a validation by the biometric service of a digital signature of the one of the biometric browser extension and the biometric browser plug-in received by the biometric service from the one of the biometric browser extension and the biometric browser plug-in;
the web server computing device configured to receive from the at least one of the biometric browser extension and the biometric browser plug in, the authentication token.

2. The apparatus of claim 1, wherein the biometric browser extension is further configured to receive user credentials associated with the user.

3. The method of claim 2 further comprising:
validating, via the web server computing device, the authentication token and the user name.

4. The apparatus of claim 1, wherein the biometric browser extension is further configured to receive user credentials associated with the user from one of the plurality of web servers.

5. The method of claim 4 further comprising:
sending to the at least one of the biometric browser extension and the biometric browser plug-in a session identification and providing to the user computing device a browser based indication that the user is logged in for the particular transaction identified by the session identification.

6. The apparatus of claim 1, further comprising a storage device configured to store a secret key associated with the user.

7. The apparatus of claim 1, wherein the biometric browser extension has an associated digital signature.

8. The apparatus of claim 1, wherein the biometric sensor is further configured to release an authentication token to the biometric service upon validation of biometrics of the user.

9. The apparatus of claim 8, wherein the authentication token comprises a secret key.

10. The apparatus of claim 8, wherein the authentication token comprises a one time password.

11. The apparatus of claim 8, wherein the authentication token comprises an RSA signature.

12. The apparatus of claim 1, wherein the biometric sensor comprises a fingerprint sensor.

13. The apparatus of claim 12, wherein the fingerprint sensor comprises a placement fingerprint sensor.

14. The apparatus of claim 12, wherein the fingerprint sensor comprises a swipe fingerprint sensor.

15. The method of claim 1, further comprising:
receiving, via the at least one of the biometric browser extension, at the web server computing device, at least one of the user name and a biometric sensor identification.

16. A method comprising:
providing, via a web server computing device, to a user computing device, at least one of a biometric browser extension and a biometric browser plug-in, as part of a biometric service, for execution on a user computing device;
detecting, via the at least one of the biometric browser extension and biometric browser plug-in, a visit by the user computing device to a web site produced by the web server computing device, with which the user computing device has previously been enrolled;
prompting, via the at least one of the biometric browser extension and the biometric browser plug-in, the user computing device to provide biometric identification of the user through the at least one of the biometric browser extension and the biometric browser plug-in of the biometric service utilizing a biometric sensor associated with the user computing device;
receiving, via the at least one of the biometric browser extension and the biometric browser plug-in, from the biometric service, an authentication token and user identification produced by the biometric sensor responsive to a validation of biometric identification of the user by the biometric sensor and responsive to a validation by the biometric service of a digital signature of the at least one of the biometric browser extension and the biometric browser plug-in received by the biometric service from the at least one of the biometric browser extension and the biometric browser plug-in;
receiving, via the at least one of the biometric browser extension and the biometric browser plug-in, at the web server computing device, the authentication token.

17. The method of claim 16, further comprising generating, using the at least one of the user computing device biometric browser extension and biometric browser plug-in, a request to authenticate the user of the user computing device, using the biometric sensor.

18. The method of claim 16, wherein the method is initiated in response to the at least one of the biometric browser extension and the biometric browser plug-in accessing a web site that supports biometric authentication.

19. The method of claim 18, further comprising determining, using the at least one of the biometric browser extension and the biometric browser plug-in, whether the user is enrolled with the web site being accessed.

20. The method of claim 16, further comprising creating, using the at least one of the biometric browser extension and the biometric browser plug-in, a secure communication link between the at least one of the biometric browser extension or the biometric browser plug-in and the web server computing device.

21. The method of claim 16, further comprising receiving, using the at least one of the biometric browser extension and the biometric browser plug-in, a session identifier from the web server computing device.

22. The method of claim 16, wherein the token comprises one of a secret key, a one time password, and an RSA signature.

23. Non-transitory computer readable storage media storing thereon computer readable instructions that, when executed by a computing device, cause the computing device to perform a method, the method comprising:
providing to a user computing device, at least one of a biometric browser extension and a biometric browser plug-in, as part of a biometric service, for execution on the user computing device which has previously been enrolled with a web server computing device, as part of the biometric service interfacing the user computing device and the web server computing device;
detecting a visit by a user to a web site served by the web server computing device, with which the user computing device has previously been enrolled;
prompting the user computing device to provide biometric identification of the user through at least one of the biometric browser extension and the biometric browser plug-in within the biometric service interfacing the with a biometric sensor associated with the user computing device;
receiving from the biometric service an authentication token and user identification produced by the biometric sensor responsive to a validation of biometric identification of the user by the biometric sensor and responsive to a validation by the biometric service of a digital signature of at least one of the biometric browser extension and the biometric browser plug-in received by the biometric service from the at least one of the biometric browser extension and the biometric browser extension;
receiving at the web server computing device, the authentication token from the at least one of the biometric browser extension and the biometric browser plug-in.

24. An apparatus comprising:
a user computing device configured to receive from a web server computing device at least one of a biometric browser extension and a biometric browser plug-in as part of a biometric service executing on the user computing device and interfacing the user computing device and the web server computing device;
the user computing device configured to receive from the at least one of the biometric browser extension and the biometric browser plug-in an indication that the web server computing device has detected a visit by the user computing device to a web site produced by the web server computing device, with which the user has previously been enrolled;
the user computing device configured to receive from the at least one of the biometric browser extension and the biometric browser plug-in a prompt to the user computing device to provide biometric identification of the user through the utilizing the at least one of the biometric browser extension and the biometric browser plug-in, interfacing with a biometric sensor associated with the user computing device;
the user computing device configured to provide the at least one of the biometric browser extension and the biometric browser plug-in an authentication token received from the biometric service and user identification produced by the biometric sensor responsive to a validation of biometric identification of the user by the biometric sensor and responsive to a validation by the biometric service of a digital signature of the at least one of the biometric browser extension and the biometric browser plug-in received by the biometric service from the at least one of the biometric browser extension and the biometric browser plug-in;
the user computing device configured to provide, through the at least one of the biometric browser extension and the biometric browser plug-in, the web server computing device with the authentication token.

25. A method comprising:
receiving, via a user computing device, from a web server computing device at least one of a biometric browser extension and a biometric browser plug-in as part of a biometric service executing on the user computing device and interfacing the user computing device and the web server computing device;
receiving, via the user computing device, from the at least one of the biometric browser extension and the biometric browser plug-in an indication that the web server computing device has detected a visit by the user computing device to a web site produced by the web server computing device, with which the user computing device has previously been enrolled;
receiving, via the user computing device, from the at least one of the biometric browser extension and the biometric browser plug-in a prompt to the user computing device to provide biometric identification of the user through the biometric service interfacing the at least one of the biometric browser extension and the biometric browser plug-in with a biometric sensor associated with the user computing device;
providing, via the user computing device, the at least one of the biometric browser extension and the biometric browser plug-in an authentication token received from the biometric service and user identification produced by the biometric sensor responsive to a validation of biometric identification of the user by the biometric sensor and responsive to a validation by the biometric service of a digital signature of the at least one of the biometric browser extension and the biometric browser plug-in received by the biometric service from the at least one of the biometric browser extension and the biometric browser plug-in;
providing, via the user computing device, through the at least one of the biometric browser extension and the biometric browser plug-in, the web server computing device with the authentication token.

26. Non-transitory computer readable storage media storing computer readable instructions that, when executed by a computing device, cause the computing device to perform a method, the method comprising:
receiving from a web server computing device at least one of a biometric browser extension and a biometric browser plug-in as part of a biometric service executing on the user computing device and interfacing the user computing device and the web server computing device;
receiving from the at least one of the biometric browser extension and the biometric browser plug-in an indication that the web server computing device has detected a visit by the user computing device to a web site produced by the web server computing device, with which the user computing device has previously been enrolled;
receiving from the at least one of the biometric browser extension and the biometric browser plug-in a prompt to the user computing device to provide biometric identification of the user through the biometric service utilizing the at least one of the biometric browser extension and the biometric browser plug-in interfacing with a biometric sensor associated with the user computing device;

providing the at least one of the biometric browser extension and the biometric browser plug-in an authentication token received from the biometric service and user identification produced by the biometric sensor responsive to a validation of biometric identification of the user by the biometric sensor and responsive to a validation by the biometric service of a digital signature of the at least one of the biometric browser extension and the biometric browser plug-in received by the biometric service from the at least one of the biometric browser extension and the biometric browser plug-in;

providing through the at least one of the biometric browser extension and the biometric browser plug-in, the web server computing device with the authentication token.

\* \* \* \* \*